United States Patent
Raby et al.

[19]

[11] Patent Number: 5,805,238
[45] Date of Patent: Sep. 8, 1998

[54] ADAPTIVE NOTCH FILTER FOR REMOVING RESIDUAL SUBCARRIER FROM COMPONENT VIDEO

[75] Inventors: Dean L. Raby, San Diego; John A. Eldon, Encinitas, both of Calif.

[73] Assignee: Raytheon Company, Lexington, Mass.

[21] Appl. No.: 649,148

[22] Filed: May 14, 1996

[51] Int. Cl.$^6$ ........................................... H04N 9/78
[52] U.S. Cl. ................ 348/609; 348/625; 348/631; 348/666; 348/627; 348/713
[58] Field of Search ...................... 348/609, 625, 348/631, 639, 640, 641, 667, 668, 663, 666, 713, 712, 627; H04N 9/78

[56] References Cited

U.S. PATENT DOCUMENTS

| | | | |
|---|---|---|---|
| 5,016,092 | 5/1991 | Perlman | 348/667 |
| 5,424,784 | 6/1995 | Raby | 348/668 |
| 5,550,936 | 8/1996 | Someya et al. | 348/625 |

FOREIGN PATENT DOCUMENTS

| | | | |
|---|---|---|---|
| 95562 | 4/1993 | Japan | H04N 9/78 |
| 339151 | 6/1994 | Japan | H04N 9/78 |

*Primary Examiner*—Glenton B. Burgess
*Attorney, Agent, or Firm*—Glenn H. Lenzen, Jr.

[57] ABSTRACT

The 25 Hz offset present in the subcarrier frequency of the PAL television standard causes residual and phase modified subcarrier to be left on the luminance signal, which can produce undesirable visual artifacts in the picture. In order to filter luminance therefore without loss of resolution, an adaptive luminance filtering process and structure are provided. Due to the wide range of sample frequencies that must be dealt with, there are e.g. three separate filters available selectable under software control depending on the particular video standard being filtered, i.e. for various of the of NTSC and PAL television standards. The adaptive notch filter is switched on during times of low video transitions and is by-passed during high video transitions, thus avoiding loss of resolution during the high video transitions.

24 Claims, 3 Drawing Sheets

ADAPTIVE NOTCH FILTER FOR REMOVING RESIDUAL SUBCARRIER FROM COMPONENT VIDEO

BACKGROUND OF THE INVENTION

1. Field of the Invention

This invention relates to video filtering and more specifically to a digital notch filter suitable for filtering components of composite video.

2. Description of the Prior Art

As a matter of background, the well known NTSC color television signal includes a brightness or luminance (Y) signal ranging in frequency from direct current to a nominal bandwidth of 4.2 MHz, and a 3.58 MHz color subcarrier which is modulated in phase and amplitude to represent hue and saturation of the image. Typically the subcarrier is demodulated to produce color (chroma) difference signals R-Y, B-Y, and G-Y, which are combined with the Y signal for reproduction of red, blue, and green signal information.

A similar relationship exists in PAL television standard with different bandwidths and subcarrier frequencies.

As is well known, PAL television standard (used throughout much of the world but not in the U.S.) has a 25 Hz offset in the subcarrier frequency. That is, the subcarrier frequency is not a direct multiple of the line length. The inclusion of the 25 Hz offset into the PAL television standard greatly reduced the annoying dot pattern, caused by the presence of chrominance in the composite video signal, in old monochrome television sets. However, the 25 Hz offset in the subcarrier frequency means the PAL comb filters can never provide perfect cancellation of the chrominance signal.

PAL comb filters that use a multiple of the line frequency to delay the video signal cause residual and phase modified chrominance to be left on the luminance signal, which produces visible dot crawl on picture transitions and modulation of the flat fields of color whereas PAL comb filters that use a multiple of the subcarrier frequency to delay the video signal cause vertical distortions during horizontal luma transitions.

This problem is not limited to PAL comb filters; the degree of chrominance cancellation in analog comb filters is directly proportional to the accuracy of the delay line and to the consistency of the video line length. Both of these error sources can leave significant amounts of residual chrominance on the luminance signal and a proportional amount of high frequency luma in the chrominance channel.

Digital comb filters have a similar problem in that the quality of the sampling clock signal directly affects the degree of chrominance cancellation. A poor quality clock signal can cause substantial phase errors in the sampled chrominance signal between different taps of the comb filter, resulting in poor chrominance cancellation even in flat fields of color. In the case of high frequency luminance signals, unacceptable amounts of high frequency luma are passed through on the chroma channel producing cross color on the displayed image. Such line to line variations are for instance caused by a VCR video source due to tape stretch.

One prior art solution to this problem is removing the residual subcarrier in the luminance channel by dropping the several least significant bits of the multi-bit luminance data. This approach is effective in flat areas of color (where the color is constant over a large area) but produces a noticeable loss of resolution during video luma transitions. The use of a fixed notched filter to remove the residual chrominance signal has the disadvantage of loss of frequency band.

SUMMARY

To accommodate the need for filtering of luminance ("luma") without the attendant loss of resolution, in accordance with the invention a luminance adaptive notch filtering process and structure are provided. Due to the wide range of sample frequencies that a commercial decoder should deal with, in accordance with one embodiment of the invention three separate filters are selectable, e.g. under software control. This is applicable to both PAL and NTSC television standards, since NTSC comb decoders may also require some filtering of the luminance signal.

The present notch filter structure is adaptive because it is switched on and off depending on the particular localized picture characteristics, on a pixel-by-pixel basis. Thus the only pixels subject to the notch filtering are those where the difference in amplitude of e.g. two consecutive pixels for the luminance component of the composite video signal is less than a (user selected) threshold. Where the difference is greater than the threshold, because there is a significant transition in the luminance value, no notch filtering is applied. Thus loss of resolution during such transitions is prevented.

For an example of adaptive comb filtering of an entire video line, see U.S. Pat. No. 5,424,784, issued Jun. 13, 1995 to Dean L. Raby and incorporated herein by reference.

In one embodiment of the present invention, the adaptive notch filter accepts as input signals three consecutive pixels. A control logic portion of the filter determines for the first and second of the three pixels a magnitude difference in their lumas, and similarly determines the magnitude difference in the lumas between the second and third pixels. If either magnitude difference is greater than a (preselected) threshold value, then the notch filtering is bypassed; otherwise the notch filtering is performed. Hence, in this embodiment a three tap adaptive filter is used for the three pixels, but this is not limiting. The magnitude differences are almost zero for flat areas of the picture, i.e. low transition portions. Each magnitude difference is compared (in one embodiment) to one of four programmable thresholds. Thus only if both magnitude differences are below the preselected threshold is the notch filtering undertaken.

In one embodiment, three separate filters are provided, e.g. in one chip. These three filters cover all common NTSC and PAL television standards. However for optimum performance, the normalized notch of the filter would be the same as the normalized subcarrier frequency, and hence there would be more than three filters to cover all NTSC and PAL variations and sampling clock frequencies.

DETAILED DESCRIPTION

Figure 1:
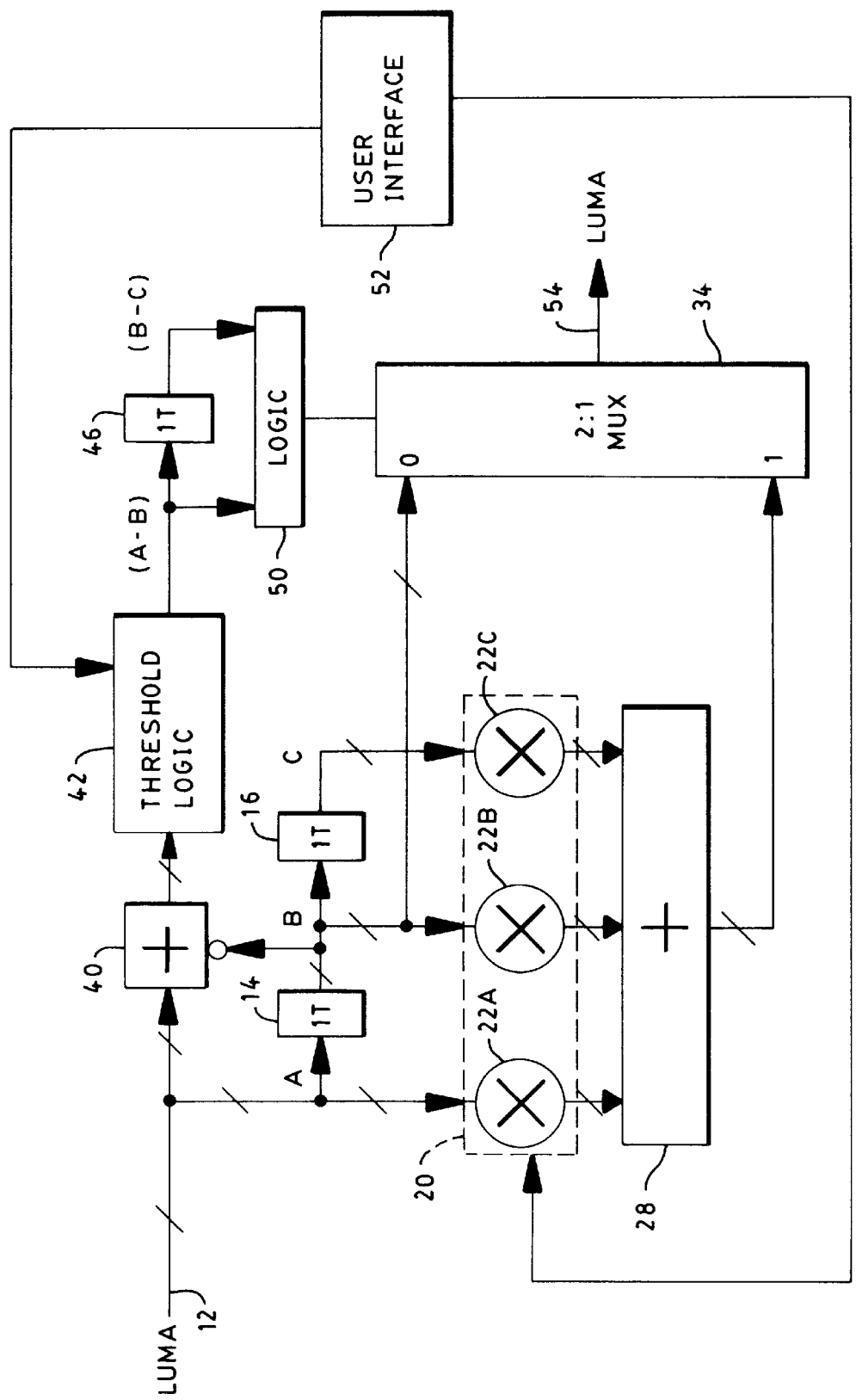
FIG. 1 shows a block diagram of a notch filter structure in accordance with the present invention.

FIG. 1 shows a block diagram of a filter structure for one component of composite video in accordance with the present invention; this diagram is illustrative and not limiting. The various components of the filter structure may be arranged differently in various embodiments and other equivalent components may be substituted for those depicted, and still be within the scope of the invention.

Moreover, while the following description is in terms of digital logic (circuitry), a software version of this filter may be implemented on a general purpose or special purpose processor of the type well known in the art, wherein the software is a computer program that configures circuits in e.g. a microprocessor such as an Intel Pentium processor operating at e.g. 160 MHz to carry out the filter functions. Thus the present digital filter may be implemented in circuitry or in a software version, and one of ordinary skill in the art would be able to write such a computer program for carrying out the functions of this digital filter in light of this disclosure.

Typical applications of the present filter are for any sort of video processor to translate (decode) composite video into component video. For instance this translation is performed in many television sets for picture-in-picture-displays. It would also be used for line doubling as used in large screen television sets. Other applications are in other type of video processing, e.g. MPEG compression, and for studio broadcast equipment for processing of component video.

Moreover while the following disclosure is in terms of notch filtering of a luminance signal, it is to be understood that this notch filtering is useable for any video component, including the color difference signal that makes up chrominance ("chroma"). For instance one may have two filters of the present type in a video processing apparatus, one for the chrominance channel and one for the luminance channel. In this case instead of processing the actual chrominance signal, the filtering is of the color difference signal which is in the baseband video after it is demodulated. This chrominance notch filtering is typically to solve the problem of residual cross color to remove color artifacts (in the chrominance domain).

The filter structure of FIG. 1 is intended for use with a digital input luminance signal which has already been subject to e.g. comb filtering to separate it from a composite video signal. (It is to be understood that this filter structure is operative with any filtering process used to separate luminance and chrominance from a composite video signal.) The input luminance signal is provided at input terminal 12. This input terminal is typically an 8 or 10 bit parallel bus of the type well known in the art. The busses conventionally depicted in FIG. 1 are all of e.g. 8 or 10 bits. The input luminance signal (here a pixel arbitrarily designated A) on input terminal 12 is provided to the input terminal of a register 14 which stores pixel A for 1 pixel clock cycle. Pixel A is read out at the end of the pixel clock cycle from register 14 to the second register 16 and stored therein. As can be seen, the output signal (pixel) from register 14 is designated pixel B and the output signal (pixel) from the second register 16 is designated pixel C.

The "center tap" signal pixel B is provided to the 0 input terminal of a 2 to 1 multiplexer (signal selector) 34.

Each of pixels A, B and C is then provided to one filter element, respectively 22A, 22B and 22C, of a notch filter 20. Notch filter 20 is for instance a conventional digital notch filter. In one embodiment each filter element 22A, 22B, and 22C is a multiplier for multiplying (weighting) the individual pixel luma value by a fixed co-efficient. The output signals from each of filter elements 22A, 22B, and 22C are then provided to adder 28 where the weighted signals A, B, and C are summed to form a single output signal provided to the 1 input of multiplexer 34. Hence multiplexer 34 receives two input signals; its first input terminal 0 receives the unfiltered center tap pixel B. Its second input terminal 1 receives the filtered (weighted) combination of pixels A, B, C. Therefore this filter structure operates on a pixel-by-pixel basis.

The upper portion of the structure of FIG. 1 is control logic to control the 2:1 multiplexer 34 to determine which of its two input signals is its output signal. As described above, the function of the control logic is to provide as the output signal on output terminal 54 of multiplexer 34 the unfiltered pixel signal B during times of high video transition (i.e. rapid transitions); at all other times the filtered output from adder 28 is to be the output signal from multiplexer 34.

The control logic operates as follows. The input luminance signal pixel A on input terminal 12 is provided to the first input terminal of subtractor 40. The second input signal to subtractor 40, on its second input terminal, is the previous pixel B. Subtractor 40 calculates A minus B which is the magnitude difference between two adjacent (sequential) pixels A and B. This magnitude difference A-B is the input signal to the threshold logic 42. Threshold logic 42 determines if the magnitude difference A-B exceeds (or does not exceed) a threshold value, and outputs the resultant indication (error signal) to register 46 and also to logic 50. In terms of internal structure, block 42 is e.g. merely several simple comparators. Register 46 is clocked by the pixel clock signal. The previous error signal for pixels B-C is output from the output terminal of register 46 and also input to logic 50.

Hence logic 50 receives two consecutive error signals representing threshold comparisons. If either magnitude difference A-B or B-C exceeds the threshold as determined by threshold logic 42, this is determined by logic 50 from the error signals to be a time of a rapid video component transition and hence no filtering is to be applied, and the logic circuit 50 provides a control signal to the control terminal of multiplexer 54 to select the center tap value pixel B as its output. Otherwise the filtered output of adder 28 is selected as the output signal from multiplexer 34. Thus logic 50 can be as simple as a two input OR gate. Logic 50 would be somewhat more complex where its inputs are two 2-bit values expressing for instance the four threshold bands, and in this case would determine if both values were below the threshold.

Hence the luminance pixel value is compared to that of the proceeding pixel to detect the magnitude change between sequential pixels; this magnitude difference is known to be almost zero for flat areas (low transitions) of the video picture. The magnitude difference is compared in threshold logic 42 to the threshold value. The two values A-B and B-C must both be less than the threshold in order to determine this to be a low transition area in which the filtering is to be used. Thus if either of the error signals from threshold logic 42 indicates that the magnitude difference is above the threshold, filter 20 is bypassed.

In accordance with one embodiment of the invention, there are e.g. four programmable thresholds stored in threshold logic 42 which are in one embodiment selected by a user interface (software) 52 coupled to threshold logic 42 as shown in FIG. 1. An example of the four programmable thresholds is shown below in Table 1. Thus the threshold logic 42 determines in which threshold "band" each of the magnitude differences A-B and B-C lie. The one bit result of each comparison of A-B and B-C to the threshold is pipelined by logic 42 to produce the error signals for A-B and B-C shown in Table 1, each percentage being a percent of full scale.

TABLE 1

| | |
|---|---|
| 00 | less than 6%. |
| 01 | less than 4.5%. |
| 10 | less than 3% |
| 11 | less than 1.5% |

It is to be understood that the division into four equal size threshold bands in Table 1 is merely for purposes of illustration. Moreover, the threshold value may be changed adaptively. For instance, under user control one might change the threshold(s) each time the video signal source changes.

Moreover, the subtractor 40 provides an absolute value output; there is no particular interest in the sign of the difference between A and B, but instead one is only concerned with the magnitude difference. A comparator or equivalent function may be substituted for subtractor 40. That is to say, one may substitute equivalent logic elements for subtractor 40 and also for the other elements shown.

For the filter 20, a 3-tap (three pixel) version is shown; it is desirable in some applications to have a larger number of taps, thereby processing 4, 5, 6, etc. pixels at one time for filtering purposes. In this case, where there are a large number of taps, in one embodiment a single error signal indicating that the magnitude difference exceeds the threshold may be ignored by logic 50. Other modifications in the filtering itself and in its control logic are of course also possible.

The particular filtering process is embedded in each of filter elements 22A, 22B and 22C. This may take many forms of the type well known in the art. One illustrative version is shown in Table 2:

TABLE 2

| Filter No. | Coefficients | | | Normalized Notch Frequency |
|---|---|---|---|---|
| | 22A | 22B | 22C | |
| 1 | 8/16 | 0/16 | 8/16 | 0.25 |
| 2 | 5/16 | 6/16 | 5/16 | 0.3 |
| 3 | 6/16 | 4/16 | 6/16 | 0.35 |

In this case each filter number is a different filter; and while only a single filter 20 is shown in FIG. 1, it is to be understood that there may be a number of such filters provided to be selected amongst by e.g. user interface 52 as shown by the control line from user interface 52 to filter 20. For instance, Table 2 relates to an embodiment with a choice of three filters. The filter coefficients shown in Table 2 indicate the relative weighting applied to each of pixels A, B, and C. For instance, for filter No. 1 the coefficient for filter element 22A is one-half (8/16), the coefficient for filter element 22B is 0, and the coefficient for filter element 22C is also one-half. These particular values are chosen for convenience of implementation in digital logic circuitry; multiplying by one-half is equivalent to a right shift by one bit while multiplication by 4/16, 5/16, and 6/16 are also economically implemented in logic circuitry. Hence filter elements 22A, 22B, 22C need not be actual multipliers, but other arithmetic elements may be substituted.

Hence for filter No. 1, pixels A and C are averaged together and pixel B is ignored. As shown in Table 2, the particular set of coefficients for filter No. 1 achieves a normalized notch frequency of 0.25, the normalized notch frequency being the ratio of the subcarrier frequency to the sampling frequency.

Filters Nos. 2 and 3 as shown in Table 2 are alternatives for other normalized notch frequency values.

The significance of the normalized notch frequencies of Table 2 is illustrated in Table 3 which is a list of television standards (left hand column) and their respective sampling frequencies and subcarrier frequencies in MHz. The subcarrier frequency divided by the sampling frequency is equal to the normalized subcarrier frequency. (Note that there are a number of different versions of each of the NTSC and PAL television standards used in different countries, as shown in Table 3.)

TABLE 3

| Video Standard | Sampling Frequency MHz | Subcarrier Frequency MHz | Normalized Subcarrier Frequency |
|---|---|---|---|
| NTSC | 12.272727 | 3.579545 | 0.2917 |
| NTSC | 13.5 | 3.579545 | 0.2652 |
| NTSC | 14.31818 | 3,579545 | 0.2500 |
| PAL-I | 13.5 | 4.43361875 | 0.3284 |
| PAL-I | 14.75 | 4.43361875 | 0.3006 |
| PAL-I | 15.00 | 4.43361875 | 0.2956 |
| PAL-I | 17.734475 | 4.3361875 | 0.2500 |
| PAL-M | 12.272727 | 3.57561149 | 0.2913 |
| PAL-M | 13.5 | 3.57561149 | 0.2649 |
| PAL-M | 14.30244596 | 3.57561149 | 0.2500 |

Therefore the three normalized notch frequencies shown respectively for filter Nos. 1, 2 and 3 in Table 2 cover the range of normalized subcarrier frequencies shown in Table 3, in an economical fashion in terms of digital logic circuitry for the filter elements. For optimum performance, the normalized notch frequency of the filter would the same as the normalized subcarrier frequency. Hence in order to cover each of the television standards shown in Table 3 individually one would instead have eight different filters (because 0.25 occurs three times in the rightmost column Table 3). However given that the range of normalized subcarrier frequencies is relatively small, as few as three individual filters as in Table 2 have been found to provide a useful choice. Of course, there may be only one filter provided with no choice of filters.

Figure 2:
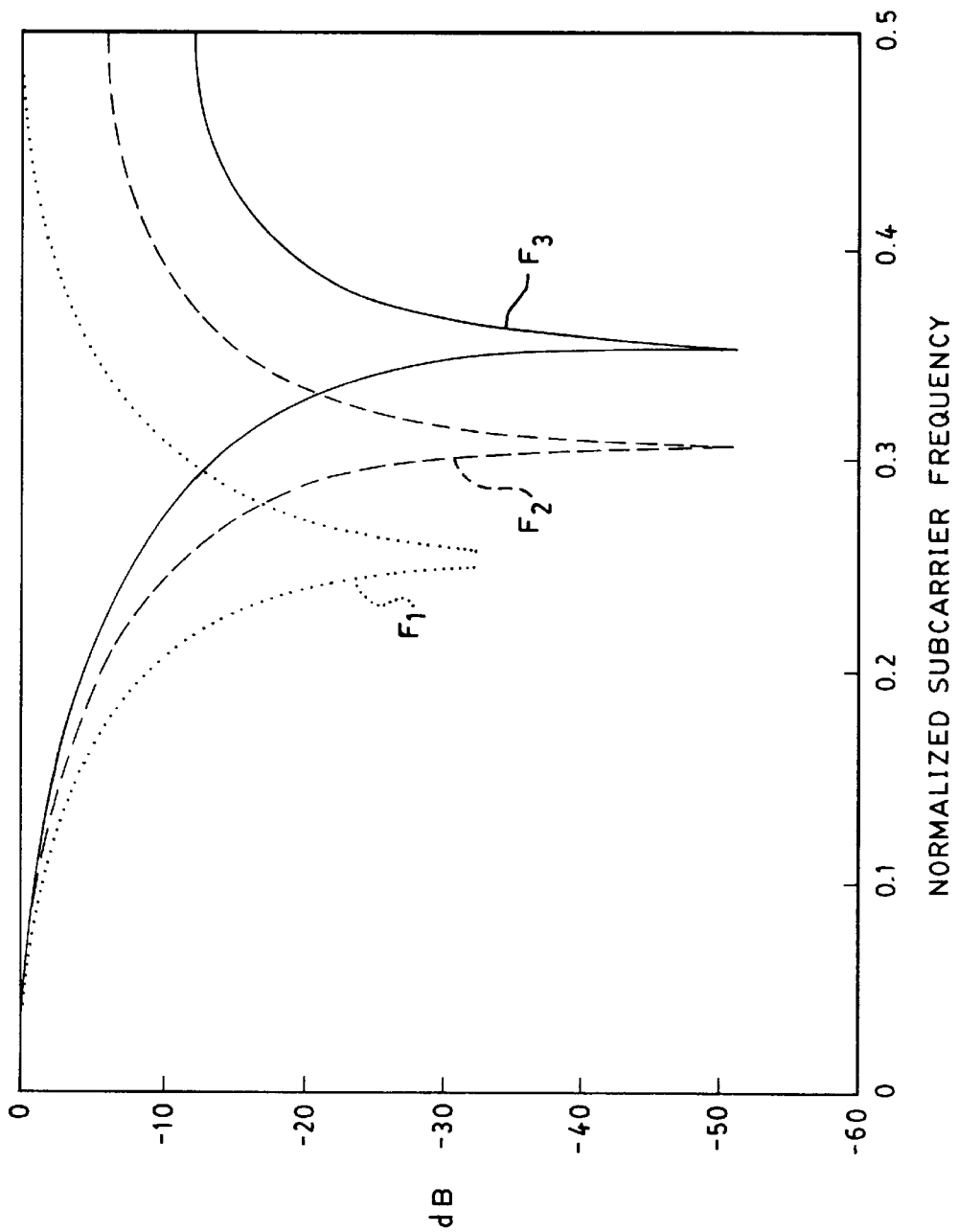
FIG. 2 shows graphically the response of the filter structure of FIG. 1.

FIG. 2 is a graph showing for three values of the normalized subcarrier frequency, i.e. three notches, the corresponding response in terms of dB of the filter of FIG. 1, given the filter coefficients of Table 2. The curves of FIG. 2 are labeled F1, F2 and F3, for respectively the three filters Nos. 1, 2 and 3 of Table 2. As can be seen, notches are present at respectively 0.25, 0.305 (approximately) and 0.35.

It is to be appreciated that with regard to the response graph of FIG. 2, a filter with additional taps would have squarer notches, i.e. be more ideal. However, since the present filter is adaptive so that large video transitions are not subject to filtering, the need for sharp notches is reduced and the performance of the filter of FIG. 1 is satisfactory. Of course the more taps in the filter the better its performance in terms of both notch position and sharpness.

Figure 3:
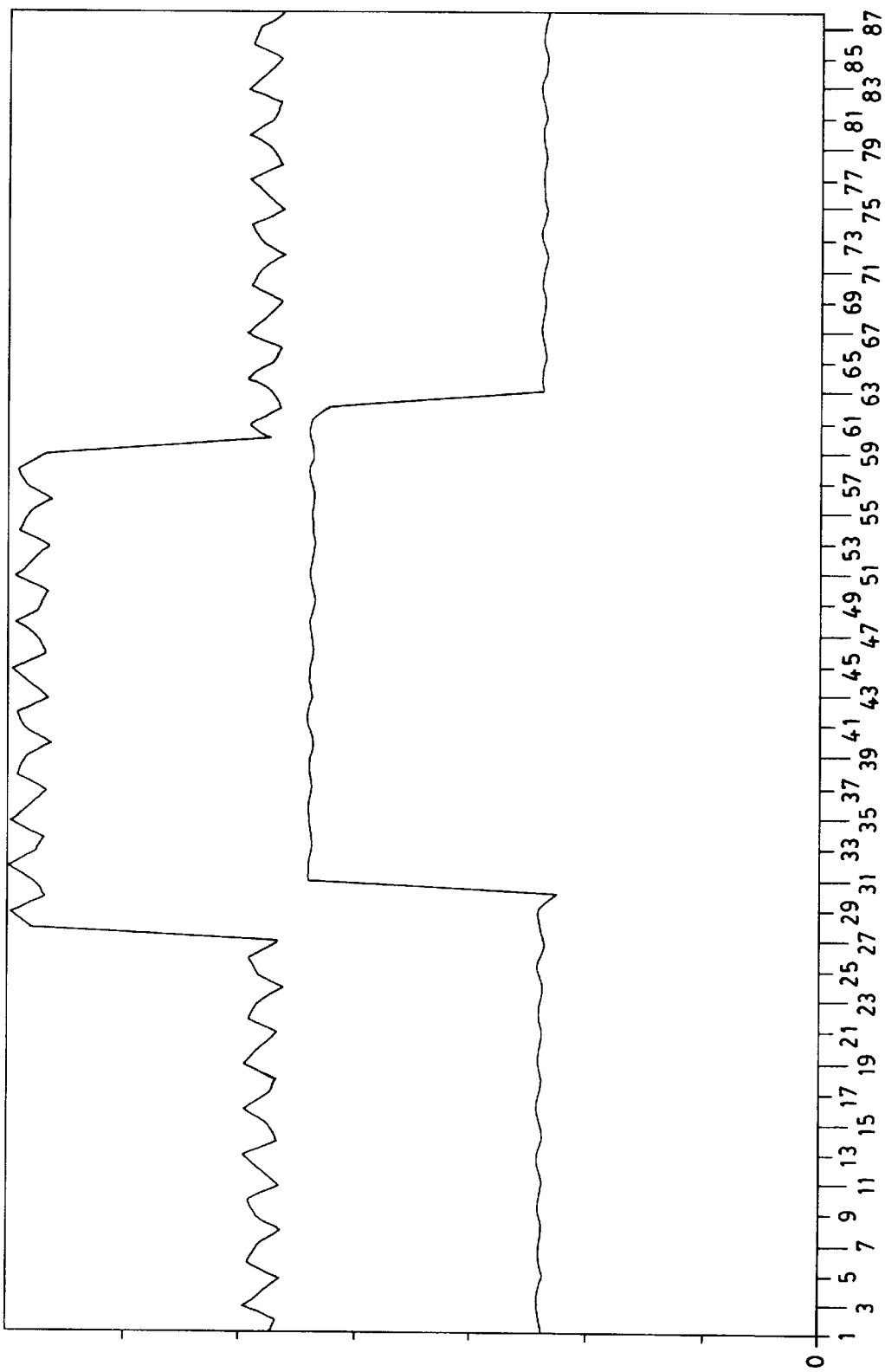
FIG. 3 shows graphically performance of the filter structure of FIG. 1.

FIG. 3 shows (upper trace) a luminance component input signal to the present notch filter structure, the ripples being the residual subcarrier signal. The horizontal axis is pixel number (i.e. time); the vertical axis is amplitude. The lower trace is the input signal shown in the upper trace after it has been processed by the present notch filter structure, showing virtual elimination of the ripples. (It is to be understood that both the upper and lower traces have the same amplitude and are displaced vertically for purposes of illustration only.)

This disclosure is illustrative and not limiting; further modifications will be apparent to one skilled in the art and are intended to fall within the scope of the present claims.

We claim:

1. A method of filtering a component of a composite video signal, comprising the steps of:
   separating the video signal into components;
   for a selected one of the components, determining if a difference in a value of the selected component for two successive pixels exceeds a threshold value; and
   filtering the selected component only if the difference is less than the threshold value.

2. The method of claim 1, wherein the selected component is luminance.

3. The method of claim 1, wherein the selected component is a color difference signal.

4. The method of claim 1, wherein the composite video signal is a PAL television standard signal.

5. The method of claim 1, wherein the composite video signal is an NTSC television standard signal.

6. The method of claim 1, further comprising the step of determining if a second difference in a value of the selected component for a second of the two successive pixels and a third successive pixel exceeds the threshold value, and
   wherein the step of filtering is performed only if the second difference is also less than the threshold.

7. The method of claim 1, wherein the step of determining includes the steps of:
   providing a plurality of thresholds; and
   selecting one of the thresholds.

8. The method of claim 1, wherein the step of filtering comprises the steps of:
   providing a plurality of digital filters; and
   selecting one of the digital filters.

9. The method of claim 1, wherein the step of filtering includes the step of multiplying the selected component by a filter coefficient for each of the two successive pixels.

10. The method of claim 1, further comprising the steps of:
    providing as an output signal the digitally filtered selected component, if the step of filtering is performed; and otherwise
    providing the unfiltered component as the output signal.

11. Structure for filtering a component of a composite video signal, comprising:
    an input terminal for receiving the video signal component;
    a filter coupled to the input terminal and having an output terminal for providing a filtered signal;
    a selector having at least two input terminals, a first input terminal being coupled to the output terminal of the filter, and having a control terminal for receiving a control signal for outputting at its output terminal one of a signal received at the first input terminal and a signal received at a second input terminal, depending on a state of the control signal, the second input terminal being coupled to the input terminal of the structure; and
    logic having an input terminal coupled to the input terminal of the structure and having an output terminal for providing the control signal, wherein the control signal has a first state if a difference in a value of the video signal component for two successive pixels exceeds a threshold, and otherwise has a second state.

12. The structure of claim 11, wherein the component is luminance.

13. The structure of claim 11, wherein the component is a color difference signal.

14. The structure of claim 11, wherein the composite video signal is a PAL television standard signal.

15. The structure of claim 11, wherein the composite video signal is an NTSC television standard signal.

16. The structure of claim 11, wherein the logic further includes:
    means for determining if a second difference in a value of the video signal component between a second of the two successive pixels and a third successive pixel exceeds the threshold; and
    means for setting the control signal to the first state if either the first or second difference exceeds the threshold.

17. The structure of claim 11, further comprising:
    means for storing a plurality of threshold values; and
    means for selecting one of the stored threshold values to be the threshold.

18. The structure of claim 11, wherein the filter includes:
    a plurality of digital filters; and
    means for selecting one of the digital filters.

19. The structure of claim 11, wherein the filter includes means for multiplying the selected video signal component by a filter coefficient for each of the two successive pixels.

20. The structure of claim 11, wherein the selector is a multiplexer.

21. The structure of claim 11, wherein the structure is a circuit.

22. The structure of claim 11, wherein the structure is software.

23. The structure of claim 11, wherein the filter includes:
    at least two registers series connected to the input terminal of the filter; and
    three filter elements, wherein a first filter element is coupled to the input terminal of the filter; a second filter element is coupled to the first register; and a third filter element is coupled to the second register.

24. The structure of claim 18, further comprising a user interface coupled to the logic and to the filter for selecting a value of the threshold and for selecting one of the plurality of digital filters.

* * * * *